Jan. 2, 1968 H. B. JANSEN 3,361,176
FASTENER WITH TRANSVERSE LOCK
Filed June 22, 1966 2 Sheets-Sheet 1
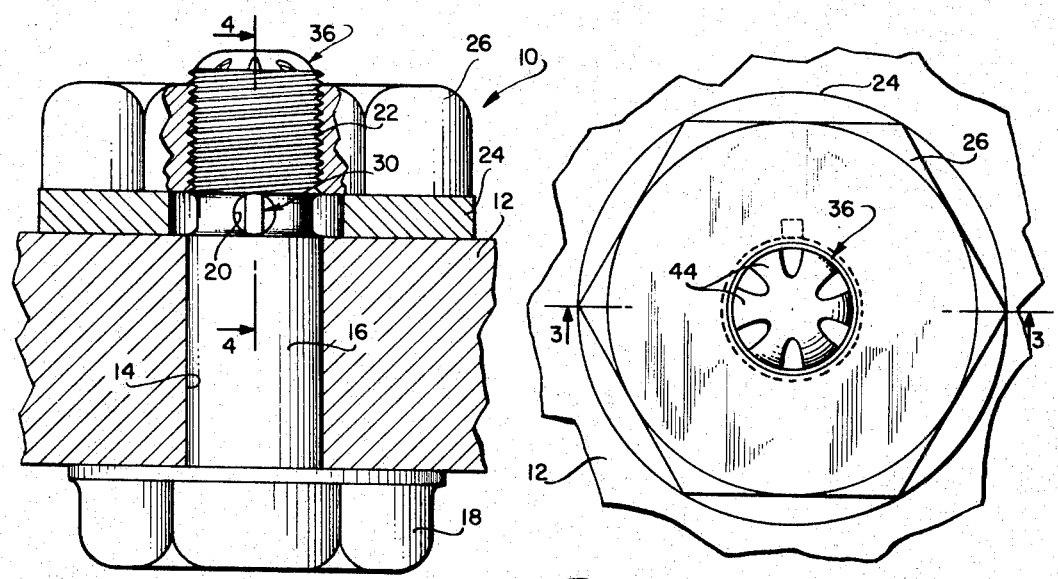
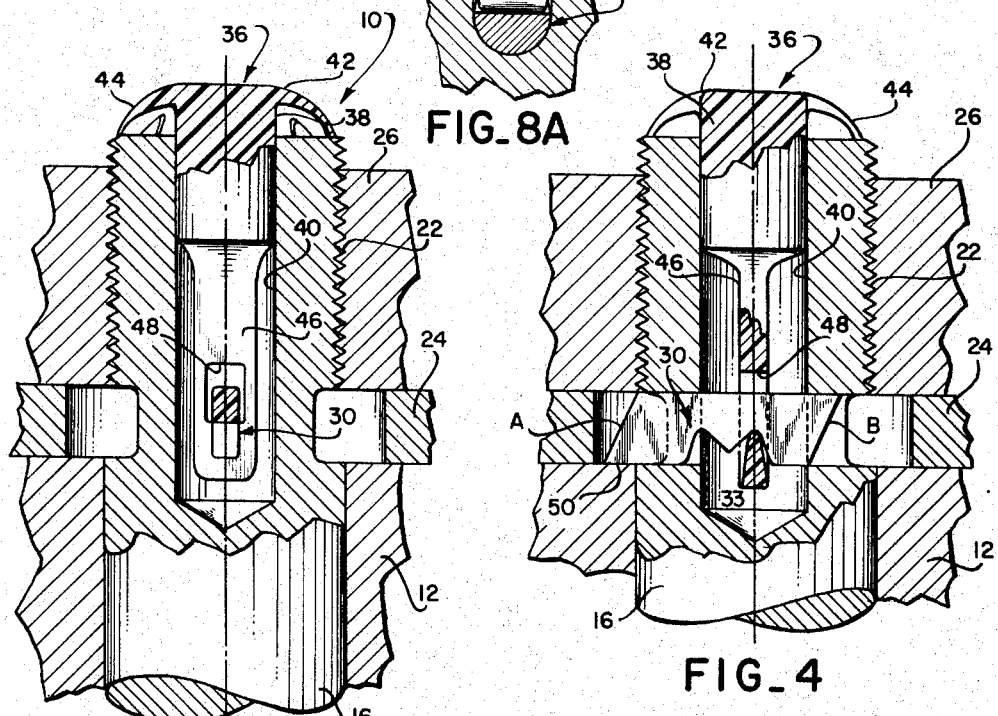
INVENTOR.
HARRY B. JANSEN
BY
George Sullivan
Agent

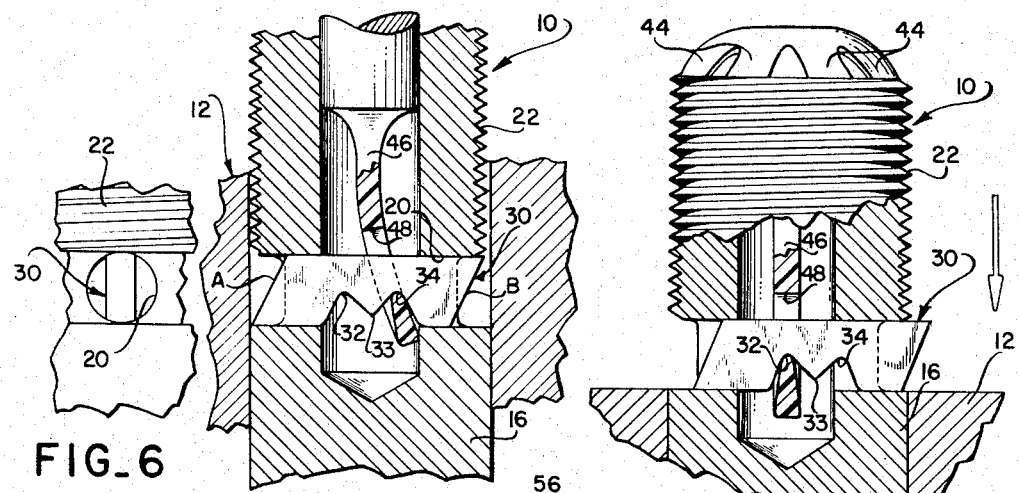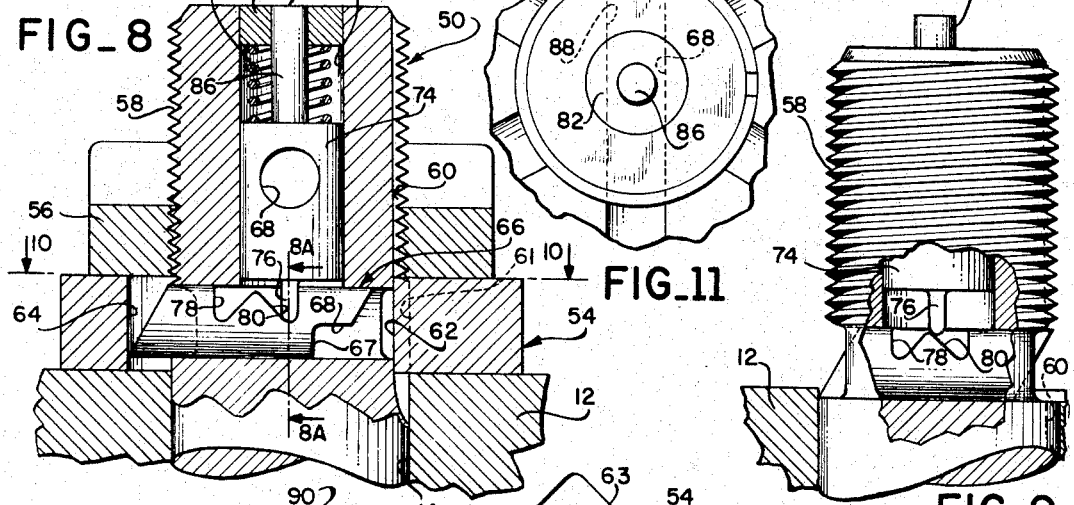

United States Patent Office 3,361,176
Patented Jan. 2, 1968

3,361,176
FASTENER WITH TRANSVERSE LOCK
Harry B. Jansen, Glendale, Calif., assignor to Lockheed Aircraft Corporation, Burbank, Calif.
Filed June 22, 1966, Ser. No. 559,626
9 Claims. (Cl. 151—62)

ABSTRACT OF THE DISCLOSURE

A fastener which comprises an elongated shaft, a head portion at one end thereof, and a transverse opening at the other end. A slidable locking pin is disposed within the shaft opening and is selectively positioned in a safety position or removal position. The pin is retained within the shaft in either of the positions by a longitudinally disposed plunger having a flexible leg which engages serrations within the pin.

---

This invention relates to a foolproof fastener which can be inserted into a workpiece and which cannot be accidentally dislodged in the event a retainer such as a threaded nut, cotter key or clevis pin is accidentally removed or not inserted.

Heretofore, there have been a great number of devices which are in the category of fasteners which could not be accidentally removed from a workpiece. It has been found that the known prior art fasteners, which operate with a safety feature, have some disadvantages which make them uneconomical or have complexities which overshadow their advantages. One such fastener from the prior art has such a complex structure that its cost is extremely high and it has such a multitude of parts making up its mechanism that the optimum strength of the fastener is markedly cut down to the point where it is impractical to use such a fastener in any area in which the strength of the fastener is critical.

Some prior art fasteners have such a complex structure that the operation of the fastener is not apparent from its visual examination. Accordingly, it is necessary to provide instructions for the insertion, removal and maintenance of the fastener. This requirement of instruction, particularly when such fasteners are used on aircraft, make it undesirable, since aircraft may be repaired or maintained by mechanics who may or may not have the instructions for removal of the device. It is possible that critical portions of the aircraft could be ruined during an attempt to remove the fastener.

Fasteners having safety features which come from the prior art often have apparatus which prevent the fastener's removal even though a retaining nut or other holding device has been removed. However, this self-same apparatus may be actuated accidentally through vibration or by application of an axial load to the fastener. This type of apparatus is especially directed to those fasteners having one or more balls or spheroidal-shaped fingers extending from the fastener when in its safety position. Another variety of prior art fastener has proven to rely on friction for its safety feature, and therefore turns out to be not foolproof and not positive in its holding ability.

Other prior art fasteners have a disadvantage in that the locking element is not visible when installed, and accordingly, it is not entirely known to the mechanic installing the fastener if installation is proper. Accordingly, the procedures for installing these fasteners must be followed precisely; and even though the procedure is followed, it is very difficult, or impossible, to inspect the assembled structures.

Another disadvantage of the prior art fasteners are those fasteners that require unusual washers or special threaded nuts to be used in combination with the fastener. In essence, special parts must be used in combination with these fasteners, and in the event of the loss of such washers or nuts, the fastener must be discarded and the safety feature is then obviated through its need for nonstandard parts.

In accordance with the present invention, the disadvantages of the prior art fasteners having safety features have been eliminated. In essence, the fastener constructed according to the present invention can be operated in such a manner that it is foolproof and it gathers all the advantages of the prior art fasteners without also inherently having the same disadvantages. The fastener according to the present invention has a minimum number of parts so that it may be installed and removed by any mechanic because the use of such a fastener is self-evident from its inspection. The number of parts used in the fastener is a feature of the present invention since the interior of the fastener is not disturbed in the region of maximum sheer stress. Therefore, the strength of the fastener according to the present invention is kept at an optimum. Further, the present invention can be installed without using special tools and it may be installed by a single individual without the need of special manipulation or installation of special devices for its proper use.

Another feature of the present invention is a locking element which is visible upon insertion of the fastener into a workpiece and visual inspection of this condition satisfies a mechanic during its installation or periodic maintenance checks. Standard washers and threaded nuts can be used in combination with the present invention and it does not need special parts in order for the fastener to function as intended.

Another feature of the present invention in a special embodiment is a visible pin which indicates whether the locking element of the fastener is, in fact, engaged, by viewing the fastener in the installed position. This feature then assures the mechanic installing or assembling the fastener to a workpiece or periodically checking the fastener during the maintenance of an aircraft or similar device that the safety fastener, according to the present invention, is in fact operating in the intended manner.

The term "fastener" as used in this specification means any fastener having a shank and a head of any configuration or a shaft having a headless end. This fastener includes a shaft which is either threaded or not threaded with any conventional or nonconventional threads. The fastener according to the present invention includes the conventional threaded screws or bolts and those which do not require nuts or other fastening devices to be used in combination with it.

A fastener constructed in accordance with the present invention is used with a workpiece having a perforation therethrough. The fastener includes an elongated shaft having a longitudinal axis, a head portion at one end and a transverse opening through the shaft at a second end. A locking pin is slideable in the shaft opening and the pin being slideable between a safety position which prevents removal of the fastener from the workpiece and a removal position which permits withdrawal of the fastener shaft through the workpiece. The pin has a first end exposed when in the safety position, the first end having a surface at an acute angle relative to the shaft longitudinal axis. The pin has a second end which is exposed from the shaft when it is in the removal position and a second end having a surface thereon which is substantially parallel to the first end surface. A means is disposed within the shaft for retaining the pin in the safety or the removal position.

Other features and advantages of the present invention will become more apparent upon review of the appended drawings and the following description:

FIGURE 1 is a front elevation of a fastener constructed in accordance with the present invention;

FIGURE 2 is a plan view of the fastener illustrated in FIGURE 1;

FIGURE 3 is a partial cross-sectional view taken along line 3—3 of FIGURE 2;

FIGURE 4 is a partial cross-sectional view of the fastener illustrated in FIGURES 1–4 and having a locking element in a central position;

FIGURE 5 is a partial cross-sectional view similar to FIGURE 4 and shown with the locking element in a safety position;

FIGURE 6 is a partial side elevation of the locking element illustrated in FIGURES 3–5;

FIGURE 7 is a partial cross-sectional view partly broken away of the locking element illustrated in FIGURES 3–6 and shown in the removal position;

FIGURE 8 is a partial cross-sectional view of another embodiment of a fastener constructed in accordance with the present invention;

FIGURE 8A is a partial cross-sectional view taken along line 8A—8A of FIGURE 8;

FIGURE 9 is a partial cross-sectional view of the fastener illustrated in FIGURE 8 with a locking element shown in the central position;

FIGURE 10 is a plan view of a washer used in conjunction with the fastener illustrated in FIGURES 8 and 9;

FIGURE 11 is a partial plan view of the fastener illustrated in FIGURES 8 and 9; and FIGURE 12 is a partial cross-sectional view of another embodiment of the present invention which has a simpler construction than those illustrated in FIGURES 1–11.

Referring now to FIGURES 1–4, there is illustrated a fastener 10 constructed according to the present invention and it is used in combination with a workpiece 12 having a perforation 14 extending therethrough. The present invention is not limited to the workpiece illustrated in FIGURE 1.

Fastener 10 includes an elongated shaft 16 having a longitudinal axis X, a head 18 at one end and a transverse opening 20 through the opposite end. The shaft 16 has a series of conventional threads 22 at the end adjacent the transverse opening 20. A conventional flat washer 24 extends around the shaft 16 and is used to support and guide a conventional threaded nut 26 which is engaged with the threads 22 and abuts the flat washer 24.

Referring now to FIGURES 3–7, a locking pin 30 having a rectangular cross-section extends through the transverse opening 20 in the fastener shank 16. This locking pin is slideable in the transverse opening between a safety position as illustrated in FIGURE 4 and a removal position as illustrated in FIGURE 7. The significance of these positions will become apparent upon further description of the locking pin and its manipulation during installation and removal of the fastener within workpiece 12. The locking pin 30 has a configuration which is similar to a parallelogram with serrations 32 and 34 cut therein. The locking pin 30 has a length which is shorter than the diameter of the shaft. The locking pin can be contained within the shaft as the fastener is inserted or removed from the workpiece as illustrated in FIGURE 5. A plunger 36 is formed with a body 38 extending into an opening 40 which is disposed axially in the fastener shank 16 and extends through the transverse opening 20. The plunger has a head 42 being formed from a plurality of arcuately-shaped identical fingers 44 which extend from the body 38 downwardly until it engages the shank 16 thus permitting axial movement of the plunger 36 by applying a force upon the head 42. A flexible leg 46 extends from the body 38 and has a rectangular-shaped perforation 48 extending therethrough. The locking pin serrations 32 and 34 intersect at a sharp point 33 so that plunger flexible leg 46 will be forced to engage one of the serrations 32, 34. The locking pin 30 extends through the rectangular perforation 48 in the plunger 36. As best shown in FIGURES 3 and 5, the locking pin serrations 32 and 34 are alternate positions in which the pin may be disposed in either a safety position or a removal position by disposing the pin serrations in engagement with the flexible leg 46. The position of the flexible leg in the two serrations are best shown in FIGURES 4 and 7. The plunger 36 is formed from a flexible material such as nylon, polypropylene, polyethylene, polyvinylchloride, or other similar plastic or elastomeric materials.

The plunger is operated by compressing the plunger body 38 into the axial opening 40 and thus permitting the locking pin 30 to be manually shifted relative to the flexible leg 46 as shown in FIGURES 4 and 7. The significance of the present invention is best understood by analysis of the operation of the fastener by installation and removal of the fastener from the workpiece 12.

Referring now to all the figures, the fastener 10 with the locking pin 30 disposed into the safety position as illustrated in FIGURE 4, is ready to be installed into the workpiece. By forcing the locking pin through the workpiece perforation 14, the sloping surface A on a first end of the locking pin tends to act as a cam and forces the locking pin centrally within the shank 16, thereby flexing the leg 46 on the plunger 36 as illustrated in FIGURE 5. The sloping surface A is disposed at an acute angle relative to the longitudinal axis X of the shank 16. As the locking pin passes through the workpiece 12, the flexible leg 46 forces the locking pin into the position illustrated in FIGURE 4 whereupon the fastener cannot be withdrawn from the workpiece without manipulation of the locking pin into a removal position as shown in FIGURE 7. A first surface 50 on the first end of the locking pin 30 is disposed at right angles relative to the shank and in essence is parallel to the surface of the workpiece 12 and thereby prevents any axial loads disposed upon the fastener shank 16 to force the pin 30 from its safety position. Even though the nut 26 and the flat washer 24 are removed, the fastener cannot be accidentally withdrawn from the workpiece until the locking pin 30 is disposed in its removal position as illustrated in FIGURE 7, which takes a manual application of force upon the locking pin coaxial to the transverse opening 20.

Thereafter, the flat washer 24 and nut 26 can be installed in a conventional manner. Other apparatus can be used in conjunction with this device, such as safety wires, cotter pins, or other apparatus which prevent removal of the nut.

Referring now to all the figures, the fastener 10 with where it is desired to remove the fastener from the workpiece 12, the locking pin 30 is shifted from the safety position FIGURE 4 to the removal position illustrated in FIGURE 7 while depressing plunger 36. A tapered surface B on the locking pin 30 is disposed at an obtuse angle relative to the axis X of the shank 16. By applying an axial force to the fastener 10, the surface B tends to cam the locking pin 30 within the shank 16, as the fastener is withdrawn from the workpiece without gouging or scratching the workpiece perforation 14. The surface B on the locking pin is substantially parallel to the surface A.

Referring now to FIGURES 8, 8A, 9 and 10, another embodiment of the present invention is illustrated in which the fastener cannot be accidentally removed from a workpiece and also gives an indication when the fastener is in a position in which it will not operate safely. The fastener 50 is formed with a conventional shank 52 that extends through a workpiece 12 having a perforation 14 therethrough. The fastener is retained on the workpiece by a washer 54 and a conventional nut 56 rotated on the threads 58 formed on the shank 52. This shank 52 includes a keyway slot 60 cut through the threads 58 and is used to position the washer 54 which includes a perforation 61 of a size large enough to slip over the shank 52. The washer 54 includes a tip 62 extending into the opening 61 on the washer and this tip is used to mate with the keyway slot 60 to prevent rotation of the washer once it is in place. Disposed opposite the tip 62 is a semicircular cutout 64 which is best shown in FIGURE 8 and which serves to provide an area for operation of a locking pin 66. A locking tab 63 extends from the washer and can be bent against the conventional nut 56 that can be threaded on the fastener to prevent inadvertent removal of the nut. A locking pin 66 of arcular cross-section is slideable in a transverse opening 68 formed in the shank 52 of the fastener 50. The locking pin 66 is shiftable between a safety position as illustrated in FIGURE 8 and a removal position which is not illustrated in the figures but is substantially identical to the position of the safety pin in the removal position illustrated in FIGURE 7. A notch 67 is formed in one end of the locking pin 66 and serves as a security measure and tends to make the fastener foolproof. This notch 67 becomes important in cases where the locking pin has been shifted to the removal position, without removing the fastener or without applying a nut. In such situations, vibration could cause the fastener to fall out of the workpiece. Therefore, the notch 67 acts as a foolproof feature by providing a surface 68 which would latch on the workpiece and prevent accidental removal of the fastener. By manually forcing the pin 66 until the notch 67 no longer engages the workpiece 12, the bolt can be removed. Since the operation of the pin is substantially identical to that discussed in the previous embodiment, further analysis of this locking pin is not deemed necessary.

A plunger 70 is disposed in an axial opening 72 formed in the fastener shank 52. The plunger 70 includes a body 74 which mates with the axial opening 72 of the fastener and is biased downwardly toward the locking pin 66. A tip 76 on the plunger 70 engages one of the serrations 78 and 80 to retain the locking pin in either a safety position as illustrated in FIGURE 8 or a removal position (not illustrated) but similar to that illustrated in FIGURE 7. A plug 82 is pressed into the axial opening 72 in order to retain the plunger 70 within the fastener. A conventional coil spring 84 is disposed beneath the plug 82 and within the axial opening 72 and acting between the plug and plunger body 74 urges the plunger tip 76 into either of the locking pin serrations 78 or 83. A feature of the present invention centers around a pin 86 which projects upwardly from the plunger body 74 and protrudes through the plug 82 as shown in FIGURE 9. This pin 86 serves to indicate when the fastener 50 is in an unlocked or unsafe position as shown in FIGURE 9, wherein the plunger pin 76 straddles the serrations 78 and 80 and the pin 86 projects outwardly from the fastener.

As shown in FIGURE 8, a perforation 68 extends through the plunger body 74 and mates with a perforation through the fastener shank 52. As shown in FIGURES 8 and 12, with these perforations 68 and 88 aligned, a conventional cotter pin, not shown, can extend through the fastener and prevent the plunger from lifting from its position. Accordingly, the fastener is locked and cannot be moved unless this cotter pin is removed.

Referring now to FIGURE 12, another embodiment of the present invention is illustrated which is quite similar to the embodiment illustrated in FIGURES 8–10. However, it serves as a very simple configuration and is considered to be most economical to manufacture and assemble. This embodiment includes a fastener 90 having a shank 52 with a threaded section 58 at one end thereof and having the transverse opening 53 through the shank closest to the threads 58. An axial opening 72 extends through the shank 52 and intersects the transverse opening 53. The locking pin 66 has the same configuration as the locking pin illustrated in the embodiment illustrated in FIGURES 1–7, and is retained in a safety position or removal position by a plunger 92 having a tip 94 coacting with the serrations 78 or 80 formed on the locking pin 66. The plunger 92 extends within an axial opening 72 in the shank 52 of the fastener. A plug 94 is pressed within the axial bore 72 of the fastener and retains the conventional coil spring 84 against the plunger 92 thereby biasing the plunger into contact with the locking pin 66. A conventional flat washer 96 and a conventional threaded nut 98 are disposed around the fastener and used in an ordinary manner.

The operation of the fastener illustrated in FIGURE 12 is exactly the same as in the previous fasteners and reiteration of this operation is deemed unnecessary.

The embodiment illustrated in FIGURE 12 has substantially all the essential features of the previous embodiments of the present invention but does not include any additional accessories or features of the previous embodiments.

It is to be understood that the present invention is not limited to the fasteners as illustrated in the appended drawings but extends to all fasteners or shafts whether threaded or unthreaded and operating in cooperation with other fastening means such as threaded nuts, clevis pins, cotter pins and the like. The present invention is subject to various modifications and alternate constructions without departing from the true spirit and scope of the invention. Therefore it is intended by the appended claims to cover all such embodiments and alternate constructions as fall within the invention.

I claim:

1. A fastener comprising:
an elongated shaft having a longitudinal axis and a transverse opening through the shaft at one end,
a locking pin having first and second serrations therein and being disposed in the shaft opening and the pin being slideable between a safety position and a removal position,
the pin having a first end exposed when in the safety position with the first end having a surface at an acute angle relative to the shaft longitudinal axis,
the pin having a second end being exposed from the shaft when in the removal position and the second end having a surface thereon which is substantially parallel to the first end surface, and
means for retaining the pin in the safety or removal position including a flexible element which extends into the first serration when the pin is in the safety position, and the element extends into the second serration when the pin is in the removal position.

2. A fastener as defined in claim 1 and in addition:
the pin being in the form of a parallelogram.

3. A fastener as defined in claim 1 and in addition:
the shaft has a cavity in the shaft's second end and the cavity intersects the transverse opening,
the pin retaining means includes a plunger having a body slideable within the shaft cavity,
the flexible element extends from the plunger and engages one of the pin serrations, and
a means for resiliently retaining the plunger in contact with one of the pin serrations.

4. A fastener as defined in claim 1 and in addition:
the shaft having a cavity that intersects the transverse opening,
the pin retaining means including a plunger having a body slideable within the shaft cavity,
a flexible leg extending from the plunger and having a perforation therethrough,
the pin extending through the plunger leg perforation, and
a series of curved resilient fingers extending from the plunger body externally of the shaft cavity and the fingers contacting the shaft,
the fingers being depressible to permit the pin to be shifted from the safety position to the removal position.

5. A fastener as defined in claim 1 and in addition:
the retaining means including an indicator extendable external to the shaft when the pin is out of the safety or removal position.

6. A fastener as defined in claim 1 and in addition:
the pin has a notch formed on the pin second end which is exposed when the pin is in a removal position.

7. A fastener used in conjunction with a workpiece having a perforation therethrough, comprising:
an elongated shaft having a longitudinal axis and a transverse opening through the shaft,
a locking pin being disposed in the shaft opening and the pin being slideable between a safety position which prevents removal of the fastener from the workpiece and a removal position which permits withdrawal of the fastener shaft through the workpiece perforation,
the pin having a first end exposed when in the safety position with the first end having a surface which is at an acute angle relative to the shaft longitudinal axis,
the pin having a second end being exposed from the shaft when in the removal position and the second end having a surface thereon which is substantially parallel to the pin first end surface,
the locking pin having a first and a second serration thereon,
the shaft having a cavity coaxial with the longitudinal axis and intersecting the transverse opening, a plunger being slideable within the shaft cavity and including a tip extending from the plunger into contact with one of the locking pin serrations, and
means for resiliently urging the plunger into contact with the locking pin.

8. A fastener as defined in claim 7 and in addition:
the locking pin having a length which is less than the length of the shaft transverse opening.

9. A fastener as defined in claim 7 and in addition:
the locking pin serrations each having sloping sides that intersect each other such that the plunger tip will fall within one of the serrations when the locking pin is shifted between the safety position and the removal position.

References Cited

UNITED STATES PATENTS

| | | | |
|---|---|---|---|
| 2,297,831 | 10/1942 | Heard | 151—6 |
| 2,472,651 | 6/1949 | Diaper | 24—211 |
| 2,782,672 | 2/1957 | Davis | 85—5 |
| 3,016,077 | 1/1962 | Yocum | 151—70 |
| 3,145,441 | 8/1964 | Strandrud | 85—5 |
| 3,184,816 | 5/1965 | McCarthy | 85—5 |
| 3,180,390 | 4/1965 | Ockert | 151—5 |

FOREIGN PATENTS 560,313   3/1944   Great Britain.

MARION PARSONS, Jr., *Primary Examiner.*